April 15, 1924.  
C. L. DAVIS  
COMBINED VALVE AND FILLER CAP  
Filed Jan. 6, 1923

1,490,802

WITNESSES  
Guy M Spring  
Frank Fraser

Inventor  
C. L. DAVIS  
By Richard B Owen  
Attorney

Patented Apr. 15, 1924.

1,490,802

UNITED STATES PATENT OFFICE.

CHARLES L. DAVIS, OF TERLTON, OKLAHOMA.

COMBINED VALVE AND FILLER CAP.

Application filed January 6, 1923. Serial No. 611,131.

*To all whom it may concern:*

Be it known that I, CHARLES L. DAVIS, a citizen of the United States, residing at Terlton, in the county of Pawnee and State of Oklahoma, have invented certain new and useful Improvements in Combined Valves and Filler Caps, of which the following is a specification.

This invention relates to a combined valve and filler cap for the tanks of gravity feed fuel systems, and has for an object to provide a filler cap as specified, by means of which air under pressure may be forced into the tank for forcing fuel therefrom.

A further object of the invention is to provide a combined filler cap and valve as specified, which is particularly designed for use in connection with the tanks of the fuel supply systems of motor vehicles wherein the fuel is fed by gravity from the tank to the carbureter, and by means of which combined filler cap and valve, air under pressure may be forced into the tank when the gasoline therein becomes relatively low or where the level of gasoline in the tank becomes lower than the carburetor, and it is necessary to apply pressure to the gasoline to cause it to properly feed to the carbureter such as when climbing up an incline.

A further object of my invention is to provide a combined filler cap and valve as specified, whereby air may be introduced into a gas supply tank under pressure, and also to provide means whereby the air may be released from said tank so as not to retain too much pressure on the tank when the gas will feed by gravity.

Other objects and advantages of the invention will become apparent during the course of the following description.

Figure 1:
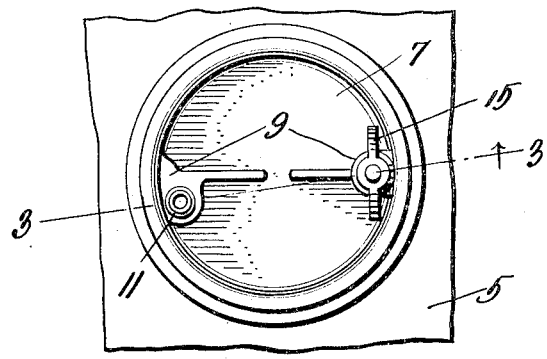
Figure 2:
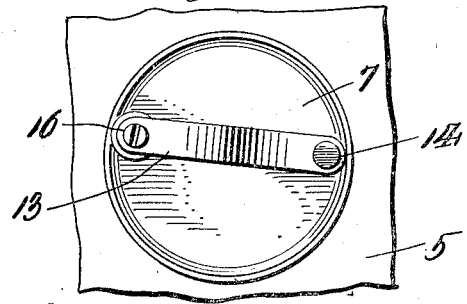
Figure 3:
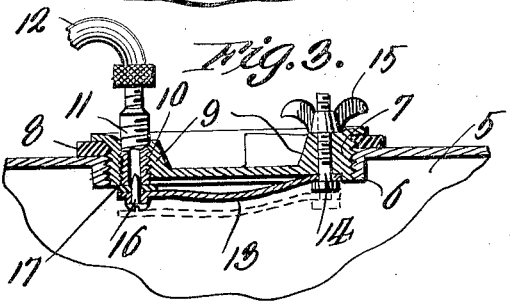

In the drawings, wherein like numerals are employed to designate like parts throughout the same, Figure 1 is a top plan view of my improved combined valve and filler cap, Figure 2 is a bottom plan view of the same, and Figure 3 is a section taken substantially on the line 3—3 and looking in the direction of the arrow.

In the drawings, wherein for the purpose of illustration is shown a preferred embodiment of my invention, the numeral 5 designates any form of gas supply tank, as is commonly found on Ford automobiles. The tank 5 is provided on its top with an aperture, said aperture having a depending threaded sleeve 6, which is adapted to receive the screw threaded cap 7. A suitable washer or gasket 8 is interposed between the flange of the cap 7 and the top of the tank 5, so as to prevent the escape of the air when it has been introduced into the tank under pressure, or to prevent the leakage of the gas from within the tank.

In accordance with my invention, the cap 7 is provided with the bosses 9, which provide means for rotating the cap, one of said bosses being provided with a threaded aperture 10 through which is adapted to be screw threadedly mounted a valve 11, such as is commonly used on pneumatic inner tubes of automobiles, so that the usual connection 12 may be connected to the valve stem 11, whereby air may be introduced into the tank 5 under pressure.

A curved springy metal member 13, is carried by means of a bolt 14 which is provided with a thumb nut 15, as is clearly illustrated in Figure 3 of the drawings. The thumb nut 15 extends through an aperture formed in the opposite boss 9 formed on the cap 7, said thumb nut 15 being located on the top of said cap, while the head of the bolt 14 is positioned within the tank. The opposite end of the springy member 13 is provided with a needle valve 16 extending upwardly, and adapted to be received within the bore of the valve 11. A small washer 17 is also carried by the arm 13, so that when the needle valve is seated in its valve, leakage of air will be positively prevented. It will of course be understood, that the springy member 13 when positioned as illustrated in full lines in Figure 3 of the drawings, will at all times hold the needle valve 16 seated, but the springy member 13 is of sufficient resiliency to allow the pressure of air introduced by means of the connection 12, through the valve 11, to open or push the needle valve and arm downwardly so as to permit the entrance of air, but as soon as the pressure is released, the member 13 will immediately urge the needle valve 16 upwardly so as to close the valve 11.

In use, the cap 7 is provided with my invention as described, and normally the thumb nut 15 is loosened sufficiently to allow the spring member 13 and the bolt 14 to drop down as illustrated in dotted lines in Figure 3 of the drawings, so that the tank and fuel contents thereof will operate as normally occurs in the usual gravity tank system of automobile fuel feeding. However, as soon as the supply of fuel within the tank 5 is very low, or it may be that the machine is going up a steep incline, so that the fuel will not feed from the tank 5 to the carbureter as is necessary. Oftentimes, when a machine, wherein fuel is carried to the carbureter by means of a gravity system, is climbing a steep incline and the fuel is very low, it is necessary to back the machine up the incline in order that fuel will be fed to the carbureter. In the present instance, however, it is only necessary to tighten the thumb nut 15, so as to draw the spring arm member 13 and the needle valve 16 upwardly so as to assume a position as is clearly illustrated in heavy lines in Figure 3 of the drawings. The ordinary form of automobile tire pump may then be connected to the valve 11 and air may be introduced within the tank under pressure, said air forcing the valve 16 open so as to allow the entrance of the air. However, as soon as the supply of air has been cut off the needle valve 16 will immediately close due to the effect of the arm 13, and the gas or other fuel will be forced through the carbureter. In other words, this invention is adapted to change the ordinary gravity feed into a force feed system when it becomes necessary to do so.

It is to be understood that the form of my invention herewith shown and described is to be taken as the preferred embodiment of the same, and that various changes in the shape, size and arrangement of parts may be resorted to, without departing from the spirit of my invention or the scope of the subjoined claims.

Having thus described my invention, what I claim as new is:—

1. A filler cap for tanks comprising a body having spaced radially extending manipulating bosses formed thereon, each boss being provided with a threaded opening adjacent to the periphery of the cap, a hollow threaded valve casing fitted in one of said openings, an adjustable bolt fitted in the other of said openings, a needle valve arranged to fit in said valve casing, and a resilient arm carrying said needle valve and supported by said adjustable bolt.

2. As a new article of manufacture, a filler cap comprising a body having a pair of spaced openings therein, a valve casing provided with a valve seat fitted in one of said openings, an adjustable member fitted in the other opening, a valve body for the valve seat, and a resilient arm carrying said valve body and supported by said member.

In testimony whereof I affix my signature in presence of two witnesses.

CHARLES L. DAVIS.

Witnesses:
G. C. SOPLINE,
W. H. DICKS.